United States Patent
Jo

(10) Patent No.: US 9,316,813 B2
(45) Date of Patent: Apr. 19, 2016

(54) LENS MODULE

(71) Applicant: SAMSUNG ELECTRO-MECHANICS CO., LTD., Suwon-Si (KR)

(72) Inventor: Yong Joo Jo, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/246,939

(22) Filed: Apr. 7, 2014

(65) Prior Publication Data

US 2015/0124334 A1 May 7, 2015

(30) Foreign Application Priority Data

Nov. 1, 2013 (KR) .................. 10-2013-0132465
Dec. 27, 2013 (KR) .................. 10-2013-0165146

(51) Int. Cl.
*G02B 3/02* (2006.01)
*G02B 13/18* (2006.01)
*G02B 9/34* (2006.01)
*G02B 13/00* (2006.01)
*G02B 9/60* (2006.01)

(52) U.S. Cl.
CPC .............. *G02B 13/0045* (2013.01); *G02B 9/60* (2013.01)

(58) Field of Classification Search
CPC ............................. G02B 9/60; G02B 13/0045
USPC ................................................. 359/714, 772
See application file for complete search history.

(56) References Cited

U.S. PATENT DOCUMENTS

| 2011/0273611 | A1 | 11/2011 | Matsusaka et al. |
| 2012/0250167 | A1* | 10/2012 | Hashimoto ...... G02B 13/00245 |
| | | | 359/738 |
| 2013/0003195 | A1 | 1/2013 | Kubota et al. |
| 2013/0088788 | A1 | 4/2013 | You |
| 2013/0100545 | A1 | 4/2013 | Jo |
| 2014/0218809 | A1* | 8/2014 | Tsai et al. .................... 359/714 |
| 2014/0307149 | A1* | 10/2014 | Chen .................... H04N 5/2252 |
| | | | 348/335 |

FOREIGN PATENT DOCUMENTS

| JP | 2011-85733 | 4/2011 |
| JP | 2012-113311 | 6/2012 |
| JP | 2013-11710 A | 1/2013 |
| KR | 10-1208235 B1 | 12/2012 |
| KR | 10-2013-0038631 | 4/2013 |
| KR | 10-2013-0043928 | 5/2013 |

OTHER PUBLICATIONS

Office Action dated Oct. 31, 2014 for Korean Patent Application No. 10-2013-0165146 and its English summary provided by Applicant's foreign counsel.
Office Action dated May 1, 2015 for Korean Patent Application No. 10-2013-0165146 and its English summary provided by Applicant's foreign counsel.
Korean Office Action issued on Oct. 2, 2015 in counterpart Korean Patent Application No. 10-2015-0118072 (pp. 1-5 in English; pp. 6-9 in Korean).

* cited by examiner

*Primary Examiner* — William Choi
(74) *Attorney, Agent, or Firm* — NSIP Law

(57) ABSTRACT

There is provided a lens module including: a first lens of which both surfaces are convex; a second lens having a meniscus shape concave toward an image; a third lens having a shape convex toward the image; a fourth lens having a meniscus shape convex toward the image; a fifth lens having a meniscus shape concave toward the image; and a stop disposed in front of an object side of the first lens, wherein when SD is a diameter of the stop and f is an overall focal length of the lens module, SD/f<0.45 is satisfied.

22 Claims, 6 Drawing Sheets

LENS MODULE

CROSS-REFERENCE TO RELATED APPLICATIONS

This application claims the benefit of Korean Patent Application Nos. 10-2013-0132465, filed on Nov. 1, 2013 and 10-2013-0165146, filed on Dec. 27, 2013, with the Korean Intellectual Property Office, the disclosures of which are incorporated in their entireties herein by reference.

BACKGROUND

The present disclosure relates to a lens module having an optical system configured of five lenses.

Recently, mobile communications terminals have been standardly equipped with camera units to allow for users to make video calls and capture images. In addition, as the functionality of the camera units included in mobile communications terminals has gradually increased, camera units for mobile communications terminals have gradually been required to have high resolution and high degrees of performance.

However, since there is a trend for mobile communications terminals to be miniaturized and lightened, there is a limitation in implementing camera units having high resolution and high performance.

In order to solve these problems, recently, camera unit lenses have been formed of plastic, a material lighter than glass, and a lens module has been configured using five or more lenses in order to implement high resolution.

However, in the case that plastic lenses are included in a camera unit it may be relatively difficult to address the problem of chromatic aberration and to implement a relatively bright optical system using lenses formed of plastic, rather than glass.

SUMMARY

An aspect of the present disclosure may provide a lens module having an aberration improvement effect, high resolution, and satisfying demands for lightness and reduced manufacturing costs.

An aspect of the present disclosure may also provide a lens module capable of being bright (having a low F no.) while having high resolution.

According to an aspect of the present disclosure, a lens module may include: a first lens of which both surfaces are convex; a second lens having a meniscus shape concave toward an image; a third lens having a shape convex toward the image; a fourth lens having a meniscus shape convex toward the image; a fifth lens having a meniscus shape concave toward the image; and a stop disposed in front of an object side of the first lens, wherein the lens module satisfies Conditional Expression 1:

$SD/f<0.45$ [Conditional Expression 1]

where SD is a diameter [mm] of the stop, and f is an overall focal length [mm] of the lens module.

The fourth lens module may have negative refractive power.

The lens module may satisfy Conditional Expression 2:

$1.1<TTL/f<1.35$ [Conditional Expression 2]

where TTL is a distance [mm] from an object-side surface of the first lens to an image surface, and f is the overall focal length [mm] of the lens module.

The lens module may satisfy Conditional Expression 3:

$|R2|>|R1|$ [Conditional Expression 3]

where R2 is a radius of curvature of an image-side surface of the first lens, and R1 is a radius of curvature of an object-side surface of the first lens.

The lens module may satisfy Conditional Expression 4:

$|R3|>|R4|$ [Conditional Expression 4]

where R3 is a radius of curvature of an object-side surface of the second lens, and R4 is a radius of curvature of an image-side surface of the second lens.

The lens module may satisfy Conditional Expression 5:

$|R5|>|R6|$ [Conditional Expression 5]

where R5 is a radius of curvature of an object-side surface of the third lens, and R6 is a radius of curvature of an image-side surface of the third lens.

The lens module may satisfy Conditional Expression 6:

$|R8|>|R7|$ [Conditional Expression 6]

where R8 is a radius of curvature of an image-side surface of the fourth lens, and R7 is a radius of curvature of an object-side surface of the fourth lens.

The lens module may satisfy Conditional Expression 7:

$SA<36$ [Conditional Expression 7]

where SA is a sweep angle at a distal end of an effective diameter of an image-side surface of the fifth lens.

The fifth lens may have inflection points formed on an object-side surface and an image-side surface thereof, respectively.

The third lens may have a meniscus shape convex toward the image.

Both surfaces of the third lens may be convex.

The first lens module may have positive refractive power.

The second lens module may have negative refractive power.

The third lens module may have positive refractive power.

The fifth lens module may have negative refractive power.

According to another aspect of the present disclosure, a lens module may include: a first lens having positive refractive power, both surfaces thereof being convex; a second lens having negative refractive power and having a meniscus shape concave toward an image; a third lens having positive refractive power and having a shape convex toward the image; a fourth lens having negative refractive power and having a meniscus shape convex toward the image; a fifth lens having negative refractive power and having a meniscus shape concave toward the image; and a stop disposed between the first lens and the second lens, wherein the lens module satisfies Conditional Expression 1:

$SD/f<0.45$ [Conditional Expression 1]

where SD is a diameter [mm] of the stop, and f is an overall focal length [mm] of the lens module.

The lens module may satisfy Conditional Expression 2:

$1.1<TTL/f<1.35$ [Conditional Expression 2]

where TTL is a distance [mm] from an object-side surface of the first lens to an image surface, and f is the overall focal length [mm] of the lens module.

The lens module may satisfy Conditional Expression 3:

$|R2|>|R1|$ [Conditional Expression 3]

where R2 is a radius of curvature of an image-side surface of the first lens, and R1 is a radius of curvature of an object-side surface of the first lens.

The lens module may satisfy Conditional Expression 4:

$$|R3|>|R4| \qquad \text{[Conditional Expression 4]}$$

where R3 is a radius of curvature of an object-side surface of the second lens, and R4 is a radius of curvature of an image-side surface of the second lens.

The lens module may satisfy Conditional Expression 5:

$$|R5|>|R6| \qquad \text{[Conditional Expression 5]}$$

where R5 is a radius of curvature of an object-side surface of the third lens, and R6 is a radius of curvature of an image-side surface of the third lens.

The lens module may satisfy Conditional Expression 6:

$$|R8|>|R7| \qquad \text{[Conditional Expression 6]}$$

where R8 is a radius of curvature of an image-side surface of the fourth lens, and R7 is a radius of curvature of an object-side surface of the fourth lens.

The lens module may satisfy Conditional Expression 7:

$$SA<36 \qquad \text{[Conditional Expression 7]}$$

where SA is a sweep angle at a distal end of an effective diameter of an image-side surface of the fifth lens.

The fifth lens may have inflection points formed on an object-side surface and an image-side surface thereof, respectively.

The third lens may have a meniscus shape convex toward the image.

Both surfaces of the third lens may be convex.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
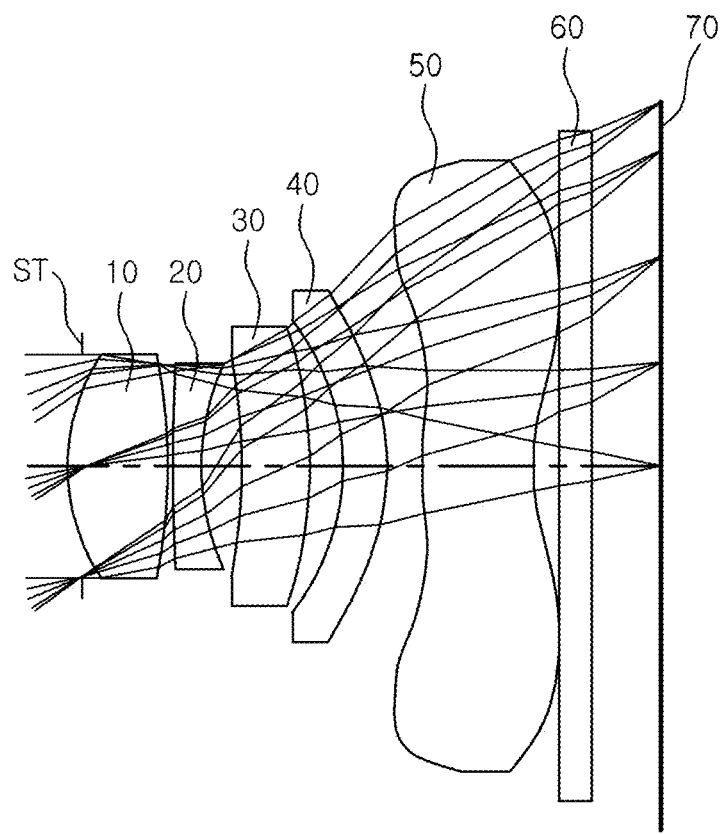
FIG. 1 is a configuration diagram of a lens module according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

In the following lens configuration diagrams, thicknesses, sizes, and shapes of lenses have been slightly exaggerated for explanation. Particularly, shapes of spherical and aspherical surfaces shown in the lens configuration diagrams are only shown byway of example. That is, the spherical surface or the aspherical surface is not limited to having the shape shown therein.

In addition, it is to be noted that a first lens refers to a lens closest to an object, and a fifth lens refers to a lens closest to an image.

Further, it is noted to be that the term 'front' refers to a direction from the lens module toward an object, while the term 'rear' refers to a direction from the lens module toward an image sensor or an image. Further, it is to be noted that in each lens, a first surface refers to a surface toward an object (or an object-side surface) and a second surface refers to a surface toward an image (or an image-side surface). Further, in the present specification, units of all of radii of curvature, thicknesses, TTLs, SDs of the lenses, an entire focal length of an optical system, and a focal length of each lens may be mm.

Further, in descriptions of lens shapes, the meaning that one surface of the lens is convex is that an optical axis portion of a corresponding surface is convex, and the meaning that one surface of the lens is concave is that an optical axis portion of a corresponding portion is concave.

Therefore, although one surface of the lens may be described as being convex, an edge portion of the lens may be concave. Conversely, although one surface of the lens may be concave, an edge portion of the lens may be convex.

A lens module according to an exemplary embodiment of the present disclosure may include an optical system configured using five lenses.

For example, the lens module according to an exemplary embodiment of the present disclosure may include a first lens 10, a second lens 20, a third lens 30, a fourth lens 40, and a fifth lens 50. However, the lens module according to an exemplary embodiment of the present disclosure is not limited to being configured using only five lenses, but may further include other components if necessary.

For example, the lens module may further include a stop ST for controlling an amount of light. In addition, the lens module may further include an infrared cut-off filter 60 filtering infrared light. Further, the lens module may further include an image sensor converting an image of a subject incident through the optical system into an electrical signal. Further, the lens module may further include an interval maintaining member adjusting an interval between lenses.

The first to fifth lenses 10 to 50 configuring the optical system may be formed of plastic.

In addition, at least one of the first to fifth lenses 10 to 50 may have an aspherical surface. In addition, the first to fifth lenses 10 to 50 may have at least one aspherical surface. That is, at least one of first and second surfaces of the first to fifth lenses 10 to 50 may be aspherical.

The optical system configured using the first to fifth lenses 10 to 50 may have F no. below 2.3. In this case, the subject may be clearly imaged. For example, the lens module according to an exemplary embodiment of the present disclosure may clearly capture an image of the subject even under a low illumination condition (for example, 100 lux or less).

In addition, the optical system configured using the first to fifth lenses 10 to 50 may have positive refractive power/ negative refractive power/positive refractive power/negative refractive power/negative refractive power sequentially from an object side.

The lens module according to an exemplary embodiment of the present disclosure may satisfy Conditional Expression 1:

$$SD/f<0.45 \qquad \text{[Conditional Expression 1]}$$

Here, SD is a diameter [mm] of the stop, and f is an overall focal length [mm] of the lens module.

The lens module according to an exemplary embodiment of the present disclosure may satisfy Conditional Expression 2:

$$1.1 < TTL/f < 1.35 \quad \text{[Conditional Expression 2]}$$

Here, TTL is a distance [mm] from a first surface of the first lens to an image surface, and f is the overall focal length [mm] of the lens module.

Here, when TTL/f is outside of an upper limit value of Conditional Expression 2, it may be difficult to miniaturize the lens module, and when TTL/f is outside of a lower limit value of Conditional Expression 2, it may be difficult to secure optical performance.

The lens module according to an exemplary embodiment of the present disclosure may satisfy Conditional Expression 3:

$$|R2| > |R1| \quad \text{[Conditional Expression 3]}$$

Here, R2 is a radius of curvature of the second surface of the first lens 10, and R1 is a radius of curvature of the first surface of the first lens 10.

Here, the first lens 10 satisfying Conditional Expression 3 may alleviate a tolerance for a shape.

The lens module according to an exemplary embodiment of the present disclosure may satisfy Conditional Expression 4:

$$|R3| > |R4| \quad \text{[Conditional Expression 4]}$$

Here, R3 is a radius of curvature of the first surface of the second lens 20, and R4 is a radius of curvature of the second surface of the second lens 20.

Here, in the case in which the second lens 20 satisfies Conditional Expression 4, a shape of the second lens 20 may be easily formed, and sensitivity of the second lens 20 may be decreased, depending on a manufacturing tolerance.

The lens module according to an exemplary embodiment of the present disclosure may satisfy Conditional Expression 5:

$$|R5| > |R6| \quad \text{[Conditional Expression 5]}$$

Here, R5 is a radius of curvature of the first surface of the third lens 30, and R6 is a radius of curvature of the second surface of the third lens 30.

Here, in the case in which the third lens 30 satisfies Conditional Expression 5, overall sensitivity of the third lens 30 may be decreased, and inflection points on each surface of the third lens 30 may be significantly decreased. Particularly, generation of the inflection point at a distal end of an effective diameter of the second surface of the third lens 30 may be suppressed, such that high performance may be implemented.

The lens module according to an exemplary embodiment of the present disclosure may satisfy Conditional Expression 6:

$$|R8| > |R7| \quad \text{[Conditional Expression 6]}$$

Here, R8 is a radius of curvature of the second surface of the fourth lens 40, and R7 is a radius of curvature of the first surface of the fourth lens 40.

Here, in the case in which the fourth lens 40 satisfies Conditional Expression 6, curvature of the second surface of the fourth lens 40 is larger than that of the first surface thereof, such that tolerance characteristics may be improved.

The lens module according to an exemplary embodiment of the present disclosure may satisfy Conditional Expression 7:

$$SA < 36 \quad \text{[Conditional Expression 7]}$$

Here, SA is a sweep angle at a distal end of an effective diameter of the second surface of the fifth lens 50.

Here, Conditional Expression 7 may be a numerical condition for significantly decreasing total internal reflection of the fifth lens 50. For example, when SA is outside of an upper limit value of Conditional Expression 7, strong internal reflection may occur at the time of capturing an image due to reflection of the second surface of the fifth lens 50 and total reflection of the first surface of the fifth lens 50, which causes deterioration of image quality.

Next, the first to fifth lens 10 to 50 configuring the lens module according to an exemplary embodiment of the present disclosure will be described.

The first lens 10 may have positive refractive power. In addition, both surfaces of the first lens 10 may be convex. For example, a first surface (object-side surface) of the first lens 10 may be convex toward the object, and a second surface (image-side surface) thereof may be convex toward the image.

At least one of the first and second surfaces of the first lens 10 may be aspherical. For example, both surfaces of the first lens may be aspherical.

The second lens 20 may have negative refractive power. In addition, a first surface of the second lens 20 may be convex toward the object, and a second surface thereof may be concave toward the image or be convex toward the object. For example, the second lens may have a meniscus shape concave toward the image.

At least one of the first and second surfaces of the second lens 20 may be aspherical. For example, both surfaces of the second lens 20 may be aspherical.

The third lens 30 may have positive refractive power. In addition, a first surface of the third lens 30 may be concave toward the object, and a second surface thereof may be convex toward the image. For example, the third lens may have a meniscus shape convex toward the image.

Unlike this, both surfaces of the third lens 30 may be convex. For example, the first surface (object-side surface) of the third lens 30 may be convex toward the object, and the second surface (image-side surface) thereof may be convex toward the image.

At least one of the first and second surfaces of the third lens 30 may be aspherical. For example, both surfaces of the third lens 30 may be aspherical.

The fourth lens 40 may have negative refractive power. In addition, the fourth lens 40 may have a meniscus shape convex toward the image. In detail, a first surface of the fourth lens 40 may be concave, and a second surface thereof may be convex toward the image.

At least one of the first and second surfaces of the fourth lens 40 may be aspherical. For example, both surfaces of the fourth lens 40 may be aspherical.

The fifth lens 50 may have negative refractive power. In addition, a first surface of the fifth lens 50 may be convex toward the object, and a second surface thereof may be concave toward the image or be convex toward the object. For example, the fifth lens may have a meniscus shape concave toward the image.

In addition, the fifth lens 50 may have inflection points formed on the first and second surfaces thereof, respectively.

At least one of the first and second surfaces of the fifth lens 50 may be aspherical. For example, both surfaces of the fifth lens 50 may be aspherical.

In the optical system configured as described above, a plurality of lenses perform an aberration correction function, whereby aberration improvement performance and resolution may be improved. Further, in the optical system, sensitivity of the lenses may be improved and a manufacturing tolerance may be alleviated. Therefore, in the optical system, all lenses may be formed of plastic having a level of optical performance lower than that of glass, whereby costs required for manufacturing the optical system may be decreased and manufacturing efficiency of the optical system may be increased.

A lens module according to an exemplary embodiment of the present disclosure will be described with reference to FIGS. 1 through 3.

A lens module according to an exemplary embodiment of the present disclosure may include an optical system including a first lens 10, a second lens 20, a third lens 30, a fourth lens 40, and a fifth lens 50, and may further include an infrared cut-off filter 60, an image sensor 70, and a stop ST.

In the lens module according to an exemplary embodiment of the present disclosure, a distance (TTL) from a first surface of the first lens 10 to an image surface may be 5.65 mm, a diameter (SD) of the stop is 2.10 mm, F no. is 2.20, and an overall focal length f of the optical system is 4.72 mm.

In addition, a focal length of the first lens 10 is 3.11 mm, a focal length of the second lens 20 is −5.58 mm, a focal length of the third lens 30 is 9.71 mm, a focal length of the fourth lens 40 is −39.95 mm, and a focal length of the fifth lens 50 is −8.80 mm.

Other characteristics of the lenses (radii of curvature of the lenses, thicknesses of lenses or distances between the lenses, refractive indices of the lenses, abbe numbers of the lenses) and aspherical coefficients of the lenses are shown in Table 1 and Table 2.

In Table 1, A(1) indicates the first surface of the first lens 10, and A(2) indicates the second surface of the first lens 10.

Referring to Table 2, a radius of curvature of the first surface of the first lens 10 may be obtained by an inverse number of a CURV value.

For example, the radius of curvature of the first surface of the first lens 10 may be 1/0.5391886=1.8546.

TABLE 1

| STOP | | | Thickness | H1 | H2 | Refractive Index/ Abbe Number |
|---|---|---|---|---|---|---|
| 1 | A(1) | A(2) | 0.952 0.05 | 2.1251 | 1.9671 | 1.544/56 |
| 2 | A(3) | A(4) | 0.28 0.3809 | 1.9324 | 1.96 | 1.639/23.4 |
| 3 | A(5) | A(6) | 0.648 0.3099 | 2.0856 | 2.6333 | 1.544/56 |
| 4 | A(7) | A(8) | 0.421 0.3305 | 2.7469 | 3.3125 | 1.639/23.4 |
| 5 | A(9) | A(10) | 1.052 0.2654 | 4.5483 | 5.7879 | 1.544/56 |
| 6 | INF | INF | 0.3 0.6611 | 6.2073 | 6.3635 | 1.517/64.2 |

TABLE 2

| ASPHERIC | CURV E | K F | A G | B H | C J | D |
|---|---|---|---|---|---|---|
| A(1) | 0.5391886 −0.0073849 | 0.0000000 0.0001227 | −0.0055553 0.0000000 | 0.0029450 0.0000000 | −0.0160719 0.0000000 | 0.0128182 |
| A(2) | −0.0600977 −0.3730040 | 0.0000000 0.0777071 | −0.1504190 0.0000000 | 0.4519940 0.0000000 | −0.7954220 0.0000000 | 0.7447300 |
| A(3) | 0.1310198 −0.3978330 | 0.0000000 0.0807344 | −0.2201310 0.0000000 | 0.5987430 0.0000000 | −0.9360010 0.0000000 | 0.8342910 |
| A(4) | 0.4142857 −0.0329299 | 1.5914363 0.0000000 | −0.1331520 0.0000000 | 0.2470090 0.0000000 | −0.2628400 0.0000000 | 0.1615170 |
| A(5) | −0.0771593 0.0756642 | 0.0000000 −0.0168868 | −0.0713802 0.0000000 | −0.0247248 0.0000000 | 0.1126640 0.0000000 | −0.1263570 |
| A(6) | −0.2610368 0.0198433 | 0.0000000 −0.0034459 | 0.0098295 0.0000000 | −0.0879801 0.0000000 | 0.1163660 0.0000000 | −0.0636713 |
| A(7) | −0.5757538 0.0294175 | 0.0000000 −0.0045082 | 0.1849370 0.0000000 | −0.2287480 0.0000000 | 0.2072930 0.0000000 | −0.1041920 |
| A(8) | −0.4903626 −0.0070871 | −2.9833067 0.0011459 | 0.0116513 0.0000000 | −0.0249361 0.0000000 | 0.0030348 0.0000000 | 0.0122568 |
| A(9) | 0.2906314 0.0000456 | −35.9427018 0.0000000 | −0.0805338 0.0000000 | 0.0087276 0.0000000 | 0.0031916 0.0000000 | −0.0007509 |
| A(10) | 0.5623970 −0.0000026 | −7.2819298 0.0000000 | −0.0339636 0.0000000 | 0.0060769 0.0000000 | −0.0009549 0.0000000 | 0.0000801 |

In an exemplary embodiment of the present disclosure, the first lens 10 may have positive refractive power, and both surfaces thereof may be convex. The second lens 20 may have negative refractive power, and a first surface thereof may be convex toward the object and a second surface thereof may be concave toward the image. The second lens may have a meniscus shape concave toward the image. The third lens 30 may have positive refractive power and may have a meniscus shape convex toward the image. The fourth lens 40 may have negative refractive power and may have a meniscus shape convex toward the image. The fifth lens 50 may have negative refractive power and may have a meniscus shape concave toward the image. In addition, the fifth lens 50 may have inflection points formed on the first and second surfaces thereof, respectively. In addition, the stop ST may be disposed in front of the first lens 10.

The stop ST disposed as described above may perform a light amount adjusting function and a vignetting function.

Meanwhile, referring to Tables 1 to 3, it may be appreciated that the lens module according to an exemplary embodiment of the present disclosure satisfies Conditional 1 to 7.

TABLE 3

| FOV | 71.00 |
|---|---|
| Fno | 2.20 |
| Focal length | 4.72 |

TABLE 3-continued

| | |
|---|---|
| TTL | 5.65 |
| SD | 2.10 |
| Element | Focal length |
| 1 | 3.11 |
| 2 | −5.58 |
| 3 | 9.71 |
| 4 | −39.95 |
| 5 | −8.80 |
| TTL/F | 1.20 |
| SD/F | 0.44 |
| L5sweepangle | 35 |

Figure 2:
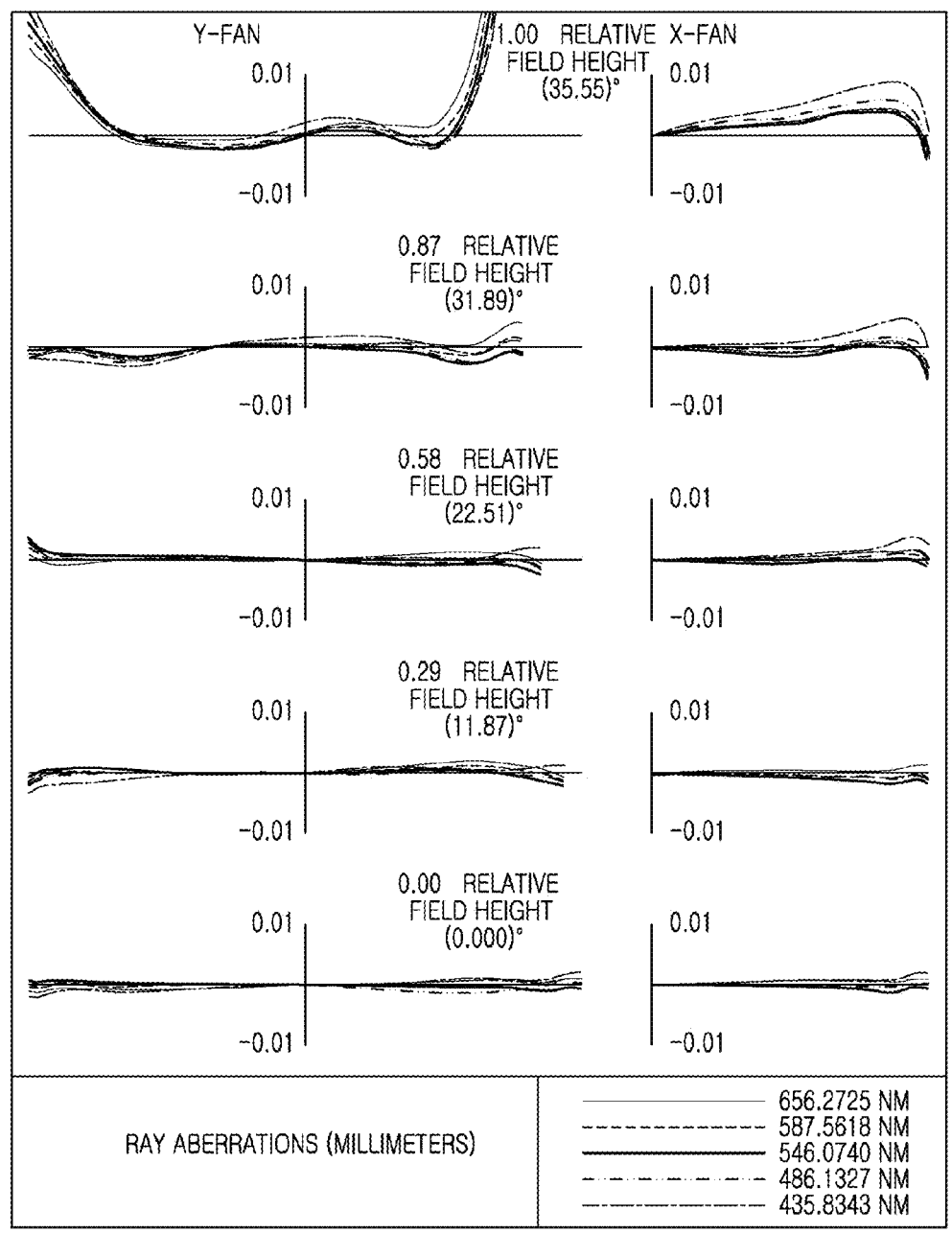
FIGS. 2 and 3 are graphs showing aberration characteristics of the lens module shown in FIG. 1.
Figure 3:
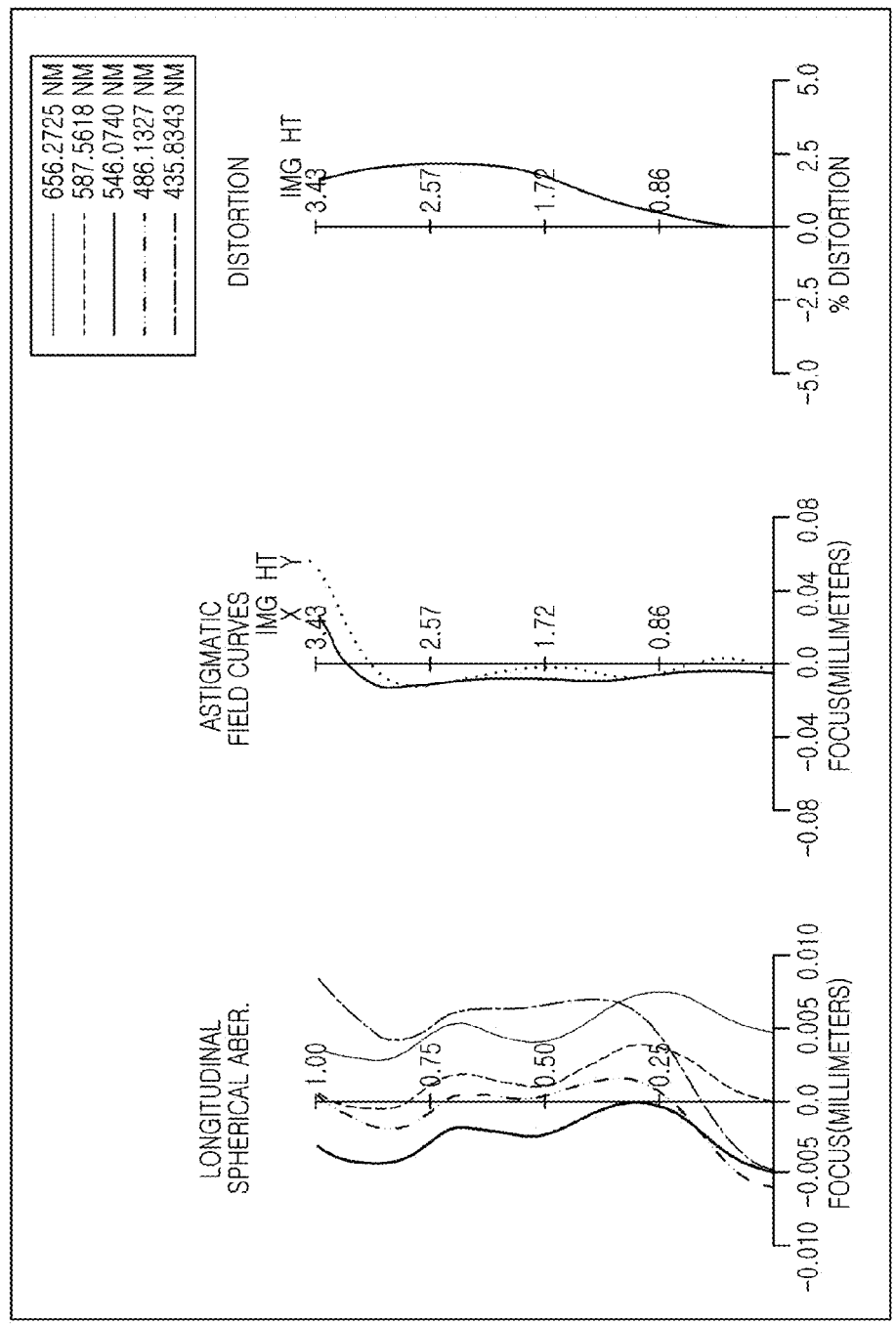

The lens module configured as described above may have aberration characteristics as shown in FIGS. 2 and 3.

Figure 4:
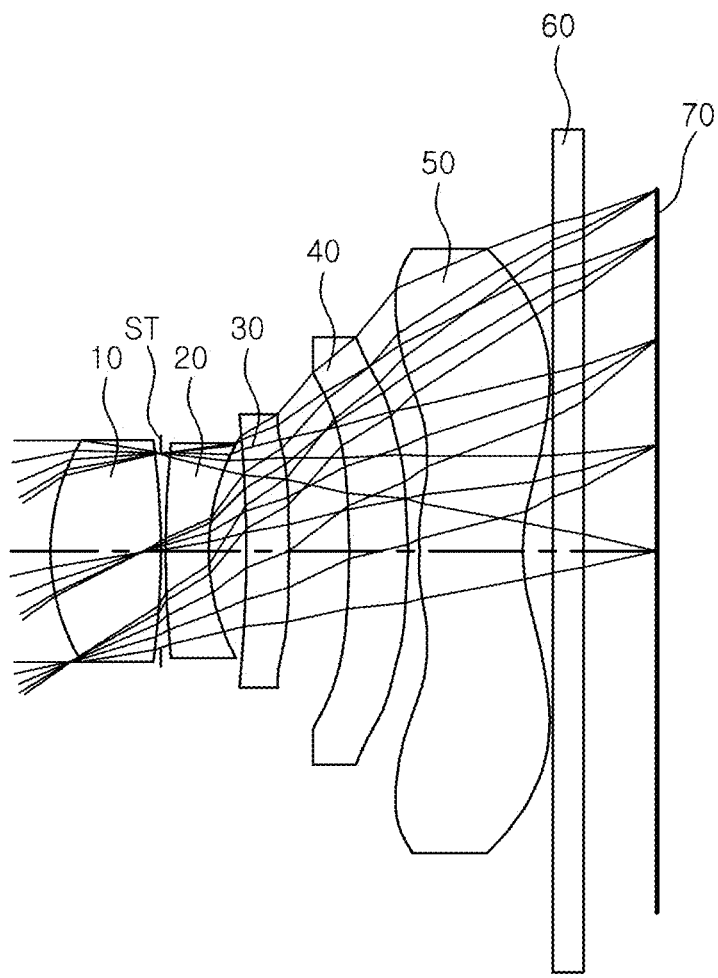
FIG. 4 is a configuration diagram of a lens module according to another exemplary embodiment of the present disclosure.
Figure 5:
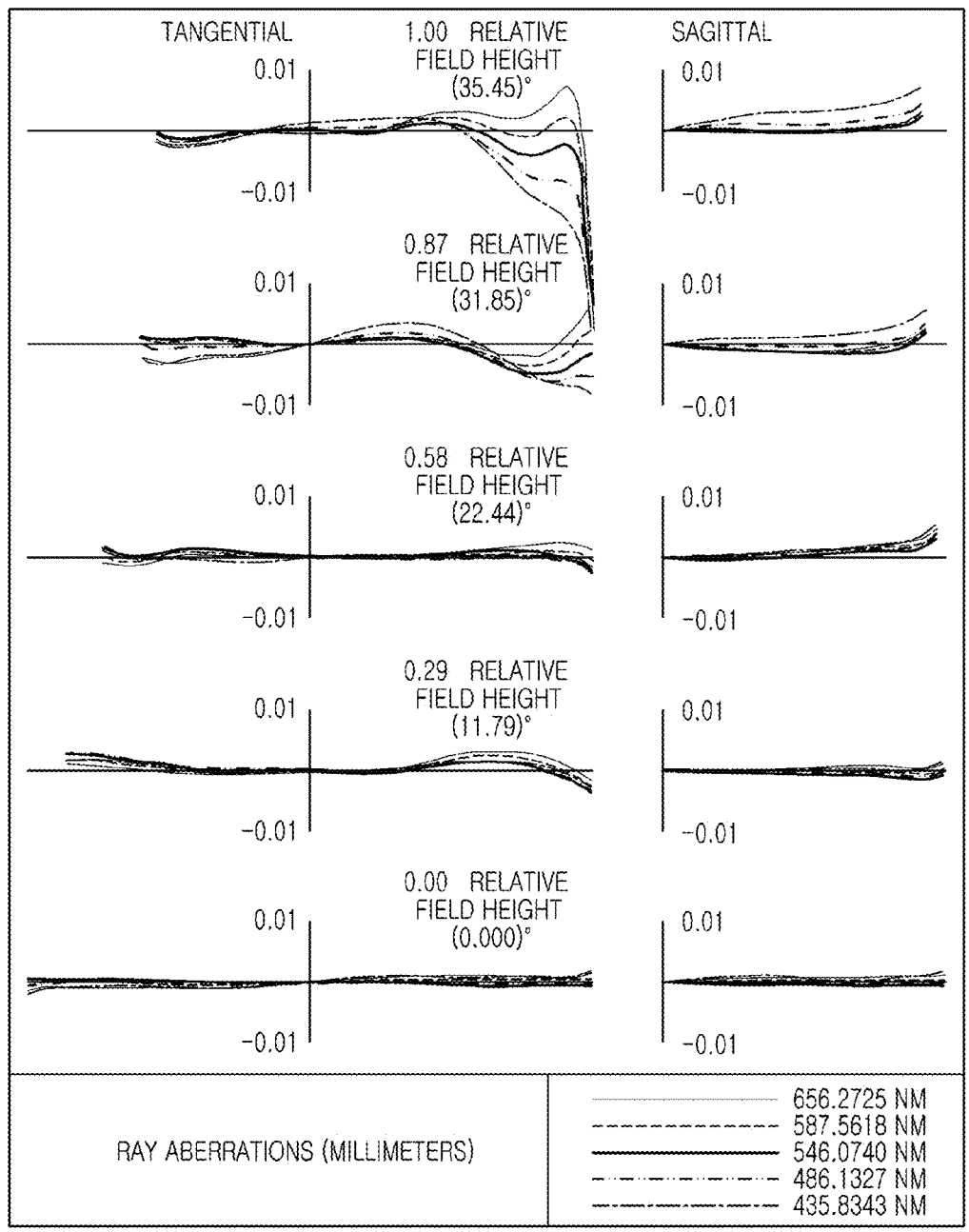
FIGS. 5 and 6 are graphs showing aberration characteristics of the lens module shown in FIG. 4.
Figure 6:
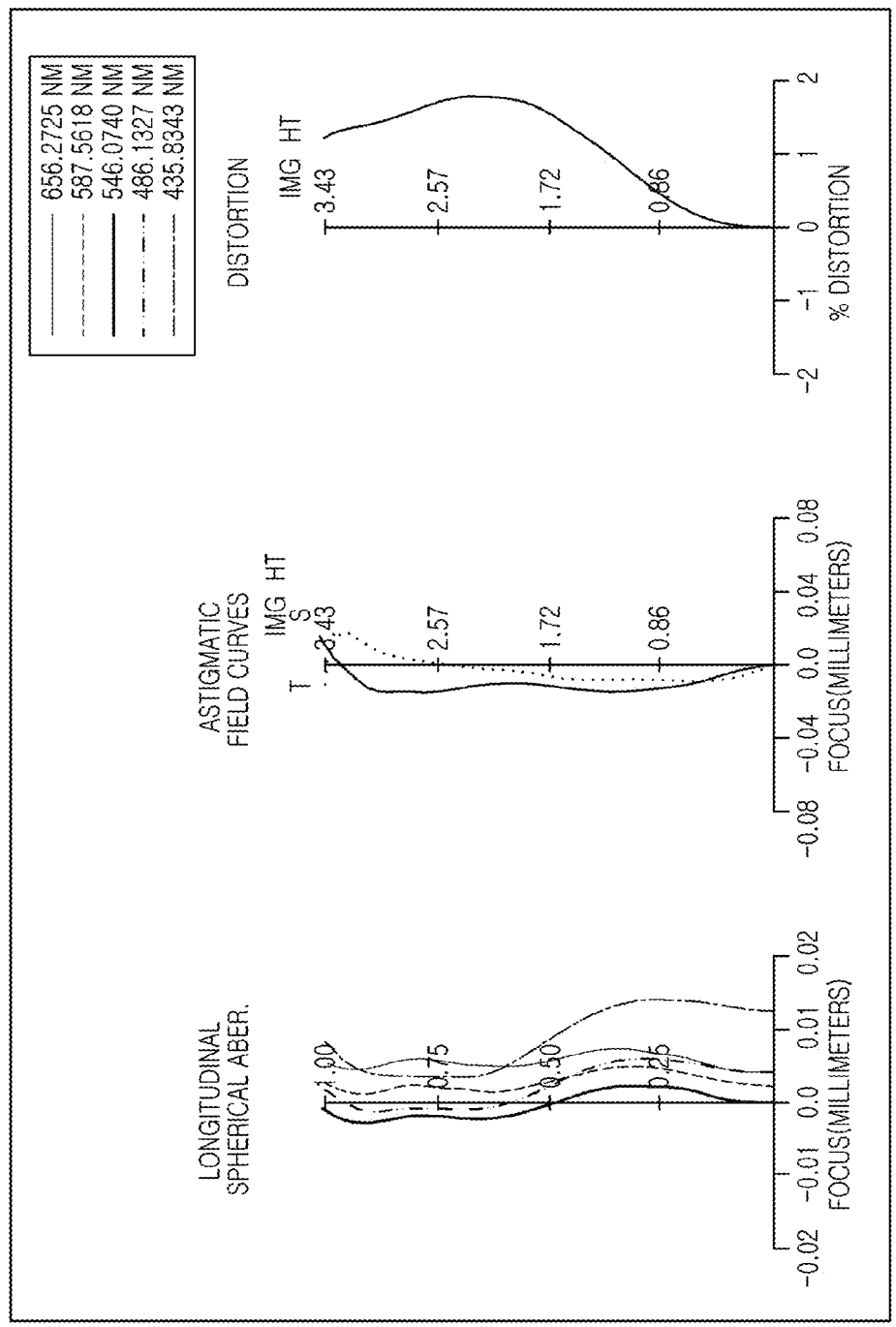

A lens module according to another exemplary embodiment of the present disclosure will be described with reference to FIGS. 4 through 6.

A lens module according to another exemplary embodiment of the present disclosure may include an optical system including a first lens 10, a second lens 20, a third lens 30, a fourth lens 40, and a fifth lens 50, and may further include an infrared cut-off filter 60, an image sensor 70, and a stop ST.

In the lens module according to another exemplary embodiment of the present disclosure, a distance (TTL) from a first surface of the first lens 10 to an image surface may be 5.65 mm, a diameter (SD) of the stop is 1.83 mm, F no. is 2.20, and an overall focal length f of the optical system is 4.75 mm.

In addition, a focal length of the first lens 10 is 3.094451 mm, a focal length of the second lens 20 is −4.571347 mm, a focal length of the third lens 30 is 16.767508 mm, a focal length of the fourth lens 40 is −28.900942 mm, and a focal length of the fifth lens 50 is −38.240826 mm.

Other characteristics of the lenses (radii of curvature of the lenses, thicknesses of lenses or distances between the lenses, refractive indices of the lenses, abbe numbers of the lenses) and aspherical coefficients of the lenses are shown in Table 4 and Table 5.

In Table 4, A(1) indicates the first surface of the first lens 10, and A(2) indicates the second surface of the first lens 10.

Referring to Table 2, a radius of curvature of the first surface of the first lens 10 may be obtained by an inverse number of a CURV value.

For example, the radius of curvature of the first surface of the first lens 10 may be 1/0.500118=1.9995.

TABLE 4

| | | | Thickness | H1 | H2 | Refractive Index/Abbe Number |
|---|---|---|---|---|---|---|
| 1 | A(1) | A(2) | 1.023 | 2.115 | 1.865 | 1.544/56.0 |
| STOP | | | | 1.827 | | |
| | | | 0.050 | | | |
| 2 | A(3) | A(4) | 0.406 | 1.872 | 2.018 | 1.639/23.4 |
| | | | 0.346 | | | |
| 3 | A(5) | A(6) | 0.398 | 2.191 | 2.579 | 1.544/56.0 |
| | | | 0.558 | | | |
| 4 | A(7) | A(8) | 0.547 | 3.356 | 4.056 | 1.639/23.4 |
| | | | 0.100 | | | |
| 5 | A(9) | A(10) | 0.963 | 4.966 | 5.733 | 1.544/56.0 |
| | | | 0.282 | | | |
| 6 | INF | INF | 0.300 | 8.000 | 8.000 | 1.517/64.2 |
| | | | 0.537 | | | |
| | | | 0.1406 | | | |

TABLE 5

| ASPHERIC | CURV E | K F | A G | B H | C J | D |
|---|---|---|---|---|---|---|
| A(1) | 0.500118 | −0.072848 | −0.007249 | 0.003994 | −0.009300 | 0.003740 |
| | −0.001483 | 0.000000 | 0.000000 | 0.000000 | 0.000000 | |
| A(2) | −0.111337 | −84.142273 | −0.015876 | 0.075750 | −0.160573 | 0.117625 |
| | −0.029865 | 0.000000 | 0.000000 | 0.000000 | 0.000000 | |
| A(3) | 0.090051 | 54.693679 | −0.038748 | 0.127721 | −0.210402 | 0.142046 |
| | −0.030494 | 0.000000 | 0.000000 | 0.000000 | 0.000000 | |
| A(4) | 0.434865 | −9.123864 | 0.044052 | 0.033260 | −0.026660 | −0.004593 |
| | 0.013069 | 0.000000 | 0.000000 | 0.000000 | 0.000000 | |
| A(5) | 0.033010 | −285.949338 | −0.063095 | −0.020431 | 0.085907 | −0.051728 |
| | 0.008077 | 0.000000 | 0.000000 | 0.000000 | 0.000000 | |
| A(6) | −0.076475 | 0.000000 | −0.044476 | −0.032849 | 0.042232 | −0.001248 |
| | −0.003847 | 0.000000 | 0.000000 | 0.000000 | 0.000000 | |
| A(7) | −0.190287 | −143.954914 | 0.016708 | −0.054829 | 0.021851 | −0.003907 |
| | 0.000546 | −0.000066 | 0.000000 | 0.000000 | 0.000000 | |
| A(8) | −0.131367 | 12.027916 | −0.009429 | −0.005965 | −0.000375 | 0.001843 |
| | −0.000500 | 0.000044 | 0.000000 | 0.000000 | 0.000000 | |
| A(9) | 0.457437 | −12.261687 | −0.117196 | 0.027723 | −0.001838 | −0.000117 |
| | 0.000020 | −0.000001 | 0.000000 | 0.000000 | 0.000000 | |
| A(10) | 0.598164 | −4.997197 | −0.061699 | 0.018187 | −0.004233 | 0.000614 |
| | −0.000052 | 0.000002 | 0.000000 | 0.000000 | 0.000000 | |

In another exemplary embodiment of the present disclosure, the first lens 10 may have positive refractive power, and both surfaces thereof may be convex. The second lens 20 may have negative refractive power, and a first surface thereof may be convex toward the object and a second surface thereof may be concave toward the image. The second lens may have a meniscus shape concave toward the image. The third lens 30 may have positive refractive power, and both surfaces thereof may be convex. The fourth lens 40 may have negative refractive power and may have a meniscus shape convex toward the image. The fifth lens 50 may have negative refractive power and may have a meniscus shape concave toward the image. In addition, the fifth lens 50 may have inflection points formed on the first and second surfaces thereof, respectively. In addition, the stop ST may be disposed between the first lens 10 and the second lens 20.

The stop ST disposed as described above may perform a light amount adjusting function and a vignetting function.

Meanwhile, referring to Tables 4 to 6, it may be appreciated that the lens module according to another exemplary embodiment of the present disclosure satisfies Conditional 1 to 7.

TABLE 6

| | |
|---|---|
| FOV | 71 |
| Fno | 2.2 |
| Focal length | 4.75 |
| TTL | 5.65 |
| SD | 1.83 |
| Element | Focal length |
| 1 | 3.094451 |
| 2 | −4.571347 |
| 3 | 16.767508 |
| 4 | −28.900942 |
| 5 | −38.240826 |
| TTL/F | 1.19 |
| SD/F | 0.39 |
| L5sweepangle | 35 |

The lens module configured as described above may have aberration characteristics as shown in FIGS. 2 and 3.

As set forth above, according to exemplary embodiments of the present disclosure, an aberration improvement effect may be improved, high resolution may be provided, and demands for lightness and a low manufacturing costs may be satisfied.

In addition, a lens module capable of being bright (having a low F no.) while having high resolution may be provided.

While exemplary embodiments have been shown and described above, it will be apparent to those skilled in the art that modifications and variations could be made without departing from the spirit and scope of the present disclosure as defined by the appended claims.

What is claimed is:

1. A lens module comprising in order from an object side to an image side:
   a first lens of which both surfaces are convex;
   a second lens having a meniscus shape concave toward an image;
   a third lens having a shape convex toward the image;
   a fourth lens having a meniscus shape convex toward the image;
   a fifth lens having negative refractive power and having a meniscus shape concave toward the image; and
   a stop disposed in front of the first lens on an object side,
   wherein the lens module satisfies Conditional Expressions 1 and 7:

$SD/f < 0.45$      [Conditional Expression 1]

$SA < 36$      [Conditional Expression 7]

where SD is a diameter [mm] of the stop, f is an overall focal length [mm] of the lens module, and SA is a sweep angle in degrees at a distal end of an effective diameter of an image-side surface of the fifth lens.

2. The lens module of claim 1, wherein the fourth lens module has negative refractive power.

3. The lens module of claim 2, wherein it satisfies Conditional Expression 2:

$1.1 < TTL/f < 1.35$      [Conditional Expression 2]

where TTL is a distance [mm] from an object-side surface of the first lens to an image surface, and f is the overall focal length [mm] of the lens module.

4. The lens module of claim 1, wherein it satisfies Conditional Expression 3:

$|R2| > |R4|$      [Conditional Expression 3]

where R2 is a radius of curvature of an image-side surface of the first lens, and R1 is a radius of curvature of an object-side surface of the first lens.

5. The lens module of claim 1, wherein it satisfies Conditional Expression 4:

$|R3| > |R4|$      [Conditional Expression 4]

where R3 is a radius of curvature of an object-side surface of the second lens, and R4 is a radius of curvature of an image-side surface of the second lens.

6. The lens module of claim 1, wherein it satisfies Conditional Expression 5:

$|R5| > |R6|$      [Conditional Expression 5]

where R5 is a radius of curvature of an object-side surface of the third lens, and R6 is a radius of curvature of an image-side surface of the third lens.

7. The lens module of claim 1, wherein it satisfies Conditional Expression 6:

$|R8| > |R7|$      [Conditional Expression 6]

where R8 is a radius of curvature of an image-side surface of the fourth lens, and R7 is a radius of curvature of an object-side surface of the fourth lens.

8. The lens module of claim 1, wherein the fifth lens has inflection points formed on an object-side surface and an image-side surface thereof, respectively.

9. The lens module of claim 1, wherein the third lens has a meniscus shape convex toward the image.

10. The lens module of claim 1, wherein both surfaces of the third lens are convex.

11. The lens module of claim 1, wherein the first lens has positive refractive power.

12. The lens module of claim 1, wherein the second lens has negative refractive power.

13. The lens module of claim 1, wherein the third lens has positive refractive power.

14. A lens module comprising in order, from an object side to an image side:
    a first lens having positive refractive power, both surfaces thereof being convex;
    a second lens having negative refractive power and having a meniscus shape concave toward an image;
    a third lens having positive refractive power, both surfaces thereof being convex;
    a fourth lens having negative refractive power and having a meniscus shape convex toward the image;
    a fifth lens having negative refractive power and having a meniscus shape concave toward the image; and
    a stop disposed between the first lens and the second lens, wherein the lens module satisfies Conditional Expression 1:

$SD/f < 0.45$      [Conditional Expression 1]

where SD is a diameter [mm] of the stop, and f is an overall focal length [mm] of the lens module.

15. The lens module of claim 14, wherein it satisfies Conditional Expression 2:

$1.1 < TTL/f < 1.35$      [Conditional Expression 2]

where TTL is a distance [mm] from an object-side surface of the first lens to an image surface, and f is the overall focal length [mm] of the lens module.

16. The lens module of claim 14, wherein it satisfies Conditional Expression 3:

$|R2| > |R1|$      [Conditional Expression 3]

where R2 is a radius of curvature of an image-side surface of the first lens, and R1 is a radius of curvature of an object-side surface of the first lens.

17. The lens module of claim 14, wherein it satisfies Conditional Expression 4:

$$|R3|>|R4|\qquad\text{[Conditional Expression 4]}$$

where R3 is a radius of curvature of an object-side surface of the second lens, and R4 is a radius of curvature of an image-side surface of the second lens.

18. The lens module of claim 14, wherein it satisfies Conditional Expression 5:

$$|R5|>|R6|\qquad\text{[Conditional Expression 5]}$$

where R5 is a radius of curvature of an object-side surface of the third lens, and R6 is a radius of curvature of an image-side surface of the third lens.

19. The lens module of claim 14, wherein it satisfies Conditional Expression 6:

$$|R8|>|R7|\qquad\text{[Conditional Expression 6]}$$

where R8 is a radius of curvature of an image-side surface of the fourth lens, and R7 is a radius of curvature of an object-side surface of the fourth lens.

20. The lens module of claim 14, wherein the fifth lens has inflection points formed on an object-side surface and an image-side surface thereof, respectively.

21. The lens module of claim 14, wherein the third lens has a meniscus shape convex toward the image.

22. A lens module comprising, in order, from an object side to an image side:
   a first lens having positive refractive power, both surfaces thereof being convex;
   a second lens having negative refractive power and having a meniscus shape concave toward an image;
   a third lens having positive refractive power and having a shape convex toward the image;
   a fourth lens having negative refractive power and having a meniscus shape convex toward the image;
   a fifth lens having negative refractive power and having a meniscus shape concave toward the image; and
   a stop disposed between the first lens and the second lens,
   wherein the lens module satisfies Conditional Expressions 1 and 7:

$$SD/f<0.45\qquad\text{[Conditional Expression 1]}$$

$$SA<36\qquad\text{[Conditional Expression 7]}$$

where SD is a diameter [mm] of the stop, f is an overall focal length [mm] of the lens module, and SA is a sweep angle in degrees at a distal end of an effective diameter of an image-side surface of the fifth lens.

\* \* \* \* \*